(12) United States Patent
Fernandez (10) Patent No.: US 8,910,076 B2
(45) Date of Patent: Dec. 9, 2014

(54) SOCIAL MEDIA PLATFORM

(76) Inventor: Juan Fernandez, Portland, OR (US)

(*) Notice: Subject to any disclaimer, the term of this patent is extended or adjusted under 35 U.S.C. 154(b) by 11 days.

(21) Appl. No.: 13/330,536

(22) Filed: Dec. 19, 2011

(65) Prior Publication Data

US 2012/0154444 A1 Jun. 21, 2012

Related U.S. Application Data

(60) Provisional application No. 61/424,600, filed on Dec. 17, 2010.

(51) Int. Cl.
*G06F 3/048* (2013.01)
*G06T 11/60* (2006.01)
*G06F 3/0481* (2013.01)
*G06F 3/0482* (2013.01)
*G06F 3/0485* (2013.01)

(52) U.S. Cl.
CPC .............. *G06T 11/60* (2013.01); *G06F 3/0481* (2013.01); *G06F 3/0482* (2013.01); *G06F 3/0485* (2013.01); *G06F 3/04817* (2013.01)
USPC ........................................................ 715/792

(58) Field of Classification Search
USPC .......................................... 715/710, 711, 792
See application file for complete search history.

(56) References Cited

U.S. PATENT DOCUMENTS

| | | | | |
|---|---|---|---|---|
| 5,561,756 A * | 10/1996 | Miller et al. | | 715/848 |
| 6,326,978 B1 * | 12/2001 | Robbins | | 345/654 |
| 8,112,770 B2 * | 2/2012 | Horvitz et al. | | 719/328 |
| 8,418,067 B2 * | 4/2013 | Cheng et al. | | 715/745 |
| 2002/0175942 A1 * | 11/2002 | Seitz, Jr. | | 345/764 |
| 2005/0204306 A1 * | 9/2005 | Kawahara et al. | | 715/782 |
| 2006/0242573 A1 * | 10/2006 | Hu et al. | | 715/530 |
| 2008/0307360 A1 * | 12/2008 | Chaudhri et al. | | 715/835 |
| 2010/0050090 A1 * | 2/2010 | Leebow | | 715/751 |
| 2010/0070910 A1 * | 3/2010 | Zimmerman et al. | | 715/781 |
| 2010/0162173 A1 * | 6/2010 | Schmitlin et al. | | 715/853 |
| 2010/0293056 A1 * | 11/2010 | Flynt et al. | | 705/14.58 |
| 2012/0260217 A1 * | 10/2012 | Celebisoy | | 715/836 |
| 2012/0272180 A1 * | 10/2012 | Larres et al. | | 715/784 |
| 2014/0047393 A1 * | 2/2014 | Steele et al. | | 715/849 |

OTHER PUBLICATIONS

Pinterest.com, http://www.pinterest.com, retrieved on Dec. 19, 2011.

* cited by examiner

*Primary Examiner* — Omar Abdul-Ali
(74) *Attorney, Agent, or Firm* — Marger Johnson & McCollom PC (57) ABSTRACT

A machine-controlled method may include creating a tile profile including multiple tiles, visually presenting the tile profile using a display, and storing the tile profile. The method may further include adding, removing, and editing the tiles and utilizing tile stacks. The method may further include any of a number of tile scrolling mechanisms.

19 Claims, 10 Drawing Sheets

Photo Taken
Dec. 16, 2011

FIG. 10

Deep Tissue Massage

There is nothing better in the world than a great, relaxing massage.

SOCIAL MEDIA PLATFORM

CROSS-REFERENCE TO RELATED APPLICATION

This application claims the benefit of U.S. Provisional Application No. 61/424,600, titled "SOCIAL MEDIA PLATFORM" and filed on Dec. 17, 2010, which is hereby incorporated herein by reference in its entirety.

TECHNICAL FIELD

The disclosed technology pertains to tools and techniques for generating and managing tile profiles in connection with social media technologies.

BACKGROUND

Human beings are visually-oriented creatures and many consider communication through images to be the most powerful form of communication for humans. While websites such as www.facebook.com, for example, allow users to post images to their personal pages, the images are generally not central to the user's presence. For example, the user's profile is typically dominated by text, lists of identified friends, public conversations with friends or others, links to friends and/or other websites, and various types of media and other content.

Other websites such as www.pinterest.com, for example, allow for user-posted images to be more dominant in the user's pages. However, the images displayed in such sites are typically confined to a certain layout, and each image tends to be associated with a number of comments that are associated with and visually displayed with the image. This additional visual data presented with each image tends to draw attention away from the image itself.

Thus, there remains a need for a way to address these and other problems associated with the prior art.

DETAILED DESCRIPTION

Embodiments of the disclosed technology may include a social media platform that involves the publishing and sharing of text, images, video, and/or virtually any other type of shareable media. Certain embodiments may include the gathering of a user's personal preferences using images and allowing for the addition of any of a number of different types of data, such as contextual descriptions and keywords, for example, to be added to those preferences. Certain implementations include the pairing of particular images, videos, or other visually displayable items, referred to herein as tiles, with corresponding contextual data. As used herein, a tile profile refers to an arrangement of multiple tiles corresponding to a particular user or entity. For example, a user who enjoys steak may have in his or her tile profile a tile, e.g., image, of a steak along with a brief description, e.g., 140 words or less, describing his or her preference for steak.

Figure 1:
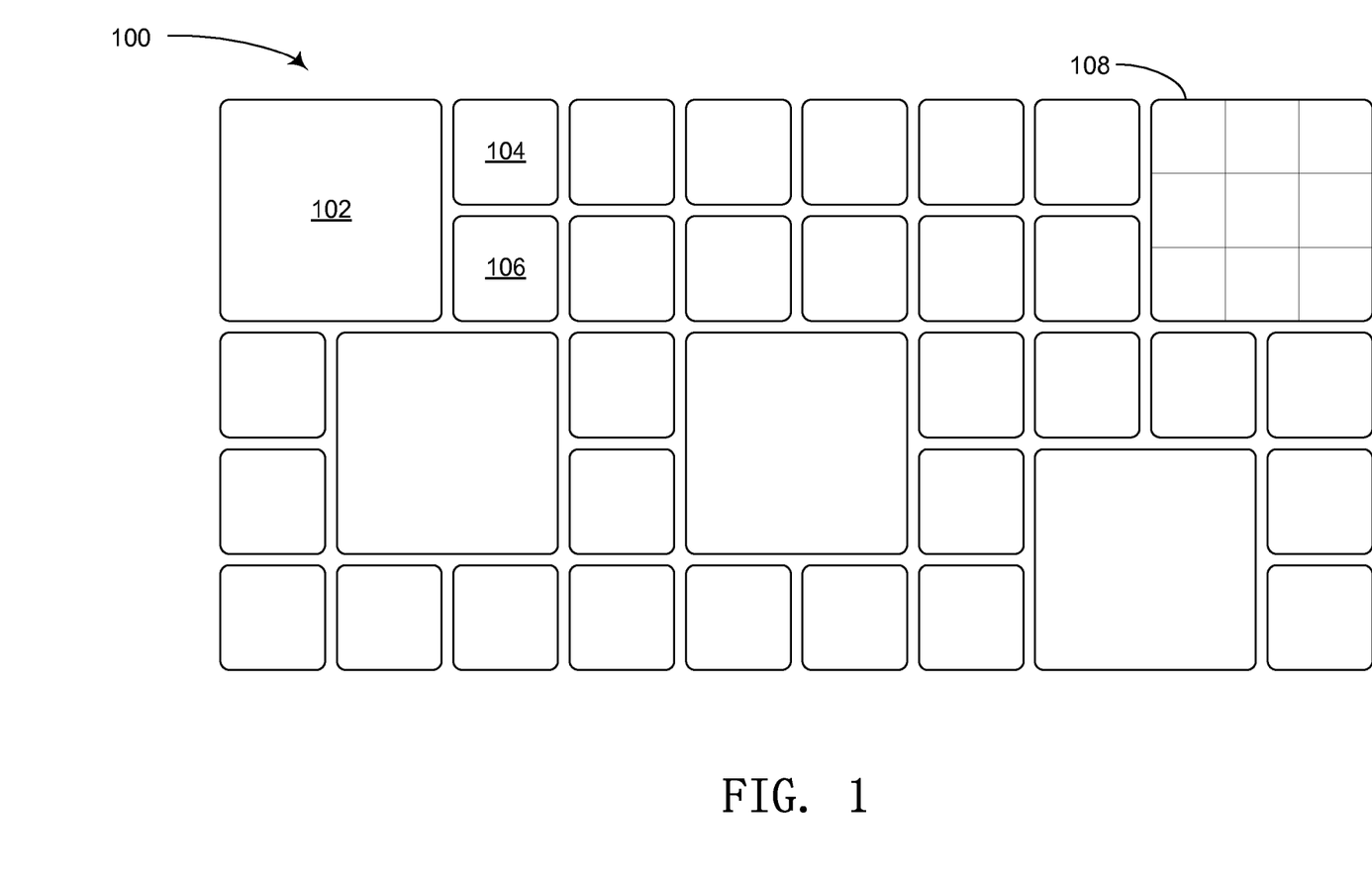
FIG. 1 illustrates an example of a tile profile in accordance with certain embodiments of the disclosed technology.

FIG. 1 illustrates an example of a tile profile 100 in accordance with certain embodiments of the disclosed technology. The tile profile 100 includes a number of tiles, such as tiles 102, 104, 106, and 108. In the example, all of the tiles within the tile profile 100 are of a substantially square shape with rounded corners. However, other embodiments may include tiles that are of any of a number of different shapes, orientations, etc. For example, certain embodiments may include tiles that are of a substantially diamond shape, a substantially rectangular shape, a substantially circular shape, a substantially oval shape, or any combination thereof.

Each tile may correspond to an item of personal interest to the user such as a person, place, or thing that the user enjoys or of which the user has fond memories, for example. Each tile as displayed may be a photograph, a drawing, a painting, a video clip, or virtually anything that can be visually presented as a tile within the tile profile 100. Some tiles, such as tile 108, may be a collection or montage of multiple sub-tiles where each sub-tile is of a type that can be the same as or different from the type of each other sub-tile.

The tiles of the tile profile 100 may be in a particular arrangement that is automatically generated by the system or individually crafted or formed by the user. Regardless of how the arrangement was initially created, the arrangement may be subsequently edited by the user. For example, the user may change the number of tiles displayed in the tile profile 100 or edit an individual tile by moving it to a different position within the tile profile 100, resizing the tile, etc. In certain embodiments, a setting may allow people other than the user to edit individually tiles or even the tile profile 100 itself. The tiles may be sorted in any of a number of different ways, such as by type, by label, by date created, by date last edited, etc.

Embodiments of the disclosed technology may include the tile profile 100 being of a particular digital file format that can be shared with anyone on any computer without needing to be connected to the web. In certain embodiments, for example, a user may keep a copy of the tile profile 100 on a USB thumb drive. The tile profile 100 may also be locked such that, so long as it remains locked, it is not to be edited by anyone, including the user.

Figure 2:
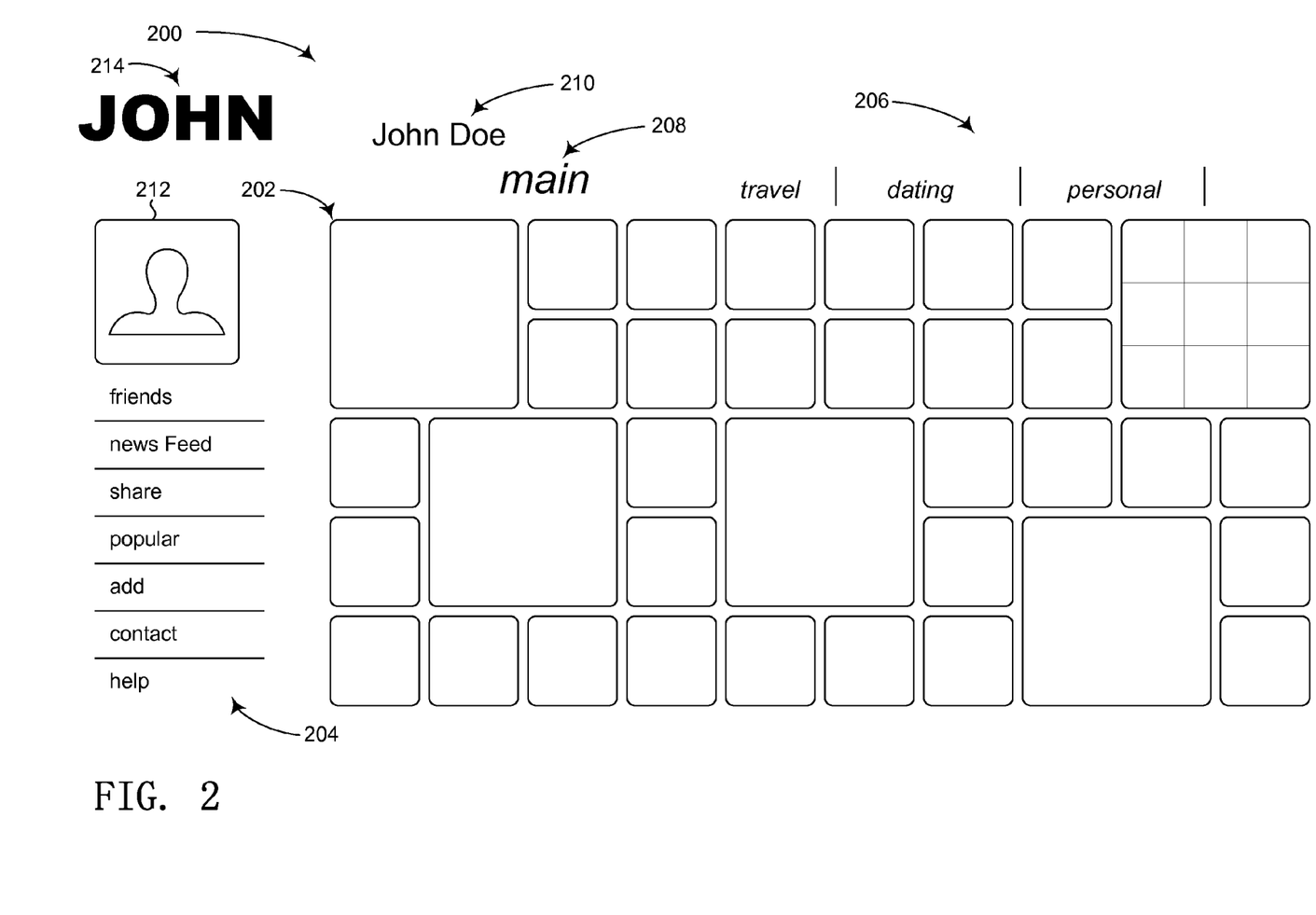
FIG. 2 illustrates a first example of a tile profile station in accordance with certain embodiments of the disclosed technology.

FIG. 2 illustrates a first example of a tile profile station 200 in accordance with certain embodiments of the disclosed technology. The tile profile station 200 includes a tile profile 202, such as the tile profile 100 of FIG. 1. The tile profile station 200 may include one or more menus. In the example, a vertical menu 204 includes links to a number of actions that are available to the user such as viewing a listing of other users' tile profiles, viewing a news feed, sharing his or her tile profile 202 with another user, viewing a listing of popular tile profiles, adding tiles to his or her tile profile 202, and contacting another user. In the example, a link to a help page is also provided by the vertical menu 204.

The tile profile station 200 of FIG. 2 also includes a horizontal menu 206 that includes a listing of the user's other tile profiles, each of which is indicated by a corresponding tile title. A current tile title 208 is used to indicate which of the user's tiles is currently presented within the tile profile station 200. As used herein, a tile portfolio refers to a collection or sub-collection of a user's tile profiles. In the example, the tile portfolio would be said to include the currently displayed tile profile 202 as well as the other tile profiles that are accessible to the user or others by way of the tile titles listed in the horizontal menu 206.

By selecting one of the tile titles listed in the horizontal menu 206, the tile profile station 200 will replace the currently displayed tile profile 202 with another tile profile that corresponds to the tile title in the horizontal menu 206 that is selected by the user. For example, selection of the "travel" tile title in the horizontal menu 206 would cause the tile profile station 200 to display the user's travel-oriented tile profile instead of the currently displayed tile profile 202. In the example, a user indicator 210 is presented to visually display a name of the user of the tile portfolio and a tile portfolio header 214 is presented to visually display a name of the tile portfolio itself. Any of a number of different indicators and headers, whether referring to the user, the tile profile station, or any particular tile profile or individual tile, may be implemented as part of the tile profile station 200.

Figure 3:
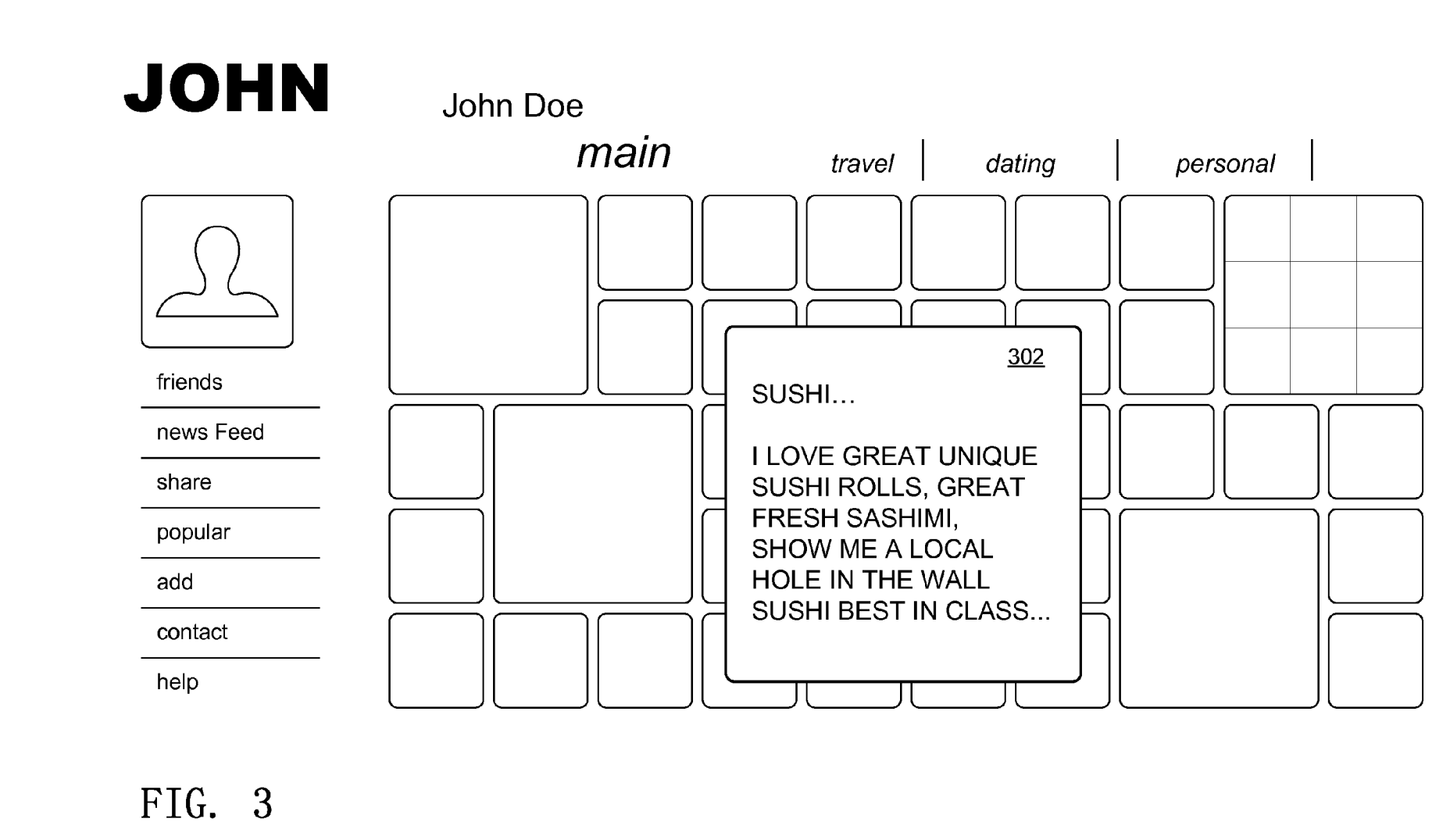
FIG. 3 illustrates a second example of a tile profile station in accordance with certain embodiments of the disclosed technology.

FIG. 3 illustrates a second example of a tile profile station 300 in accordance with certain embodiments of the disclosed technology. In the example, contextual information 302 corresponding to a particular tile within the tile profile 202 of FIG. 2, for example, is visually presented. Presentation of the contextual information 302 may result from the user or other person selecting, e.g., clicking on or hovering a pointer over, the corresponding tile. Other types of data may be presented in place of or in addition to the contextual information 302 in the example as discussed in detail below.

Figure 4:
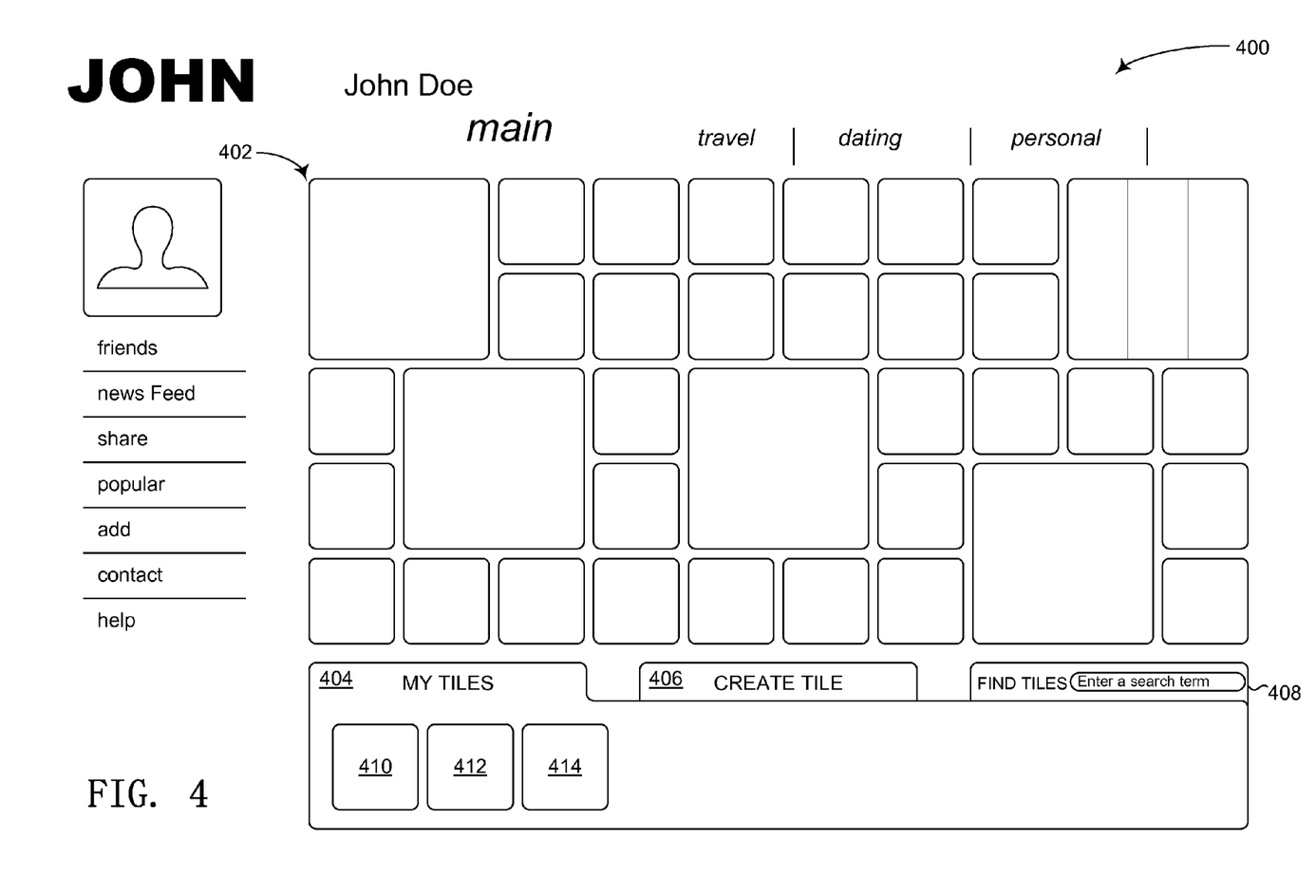
FIG. 4 illustrates a third example of a tile profile station in accordance with certain embodiments of the disclosed technology.

FIG. 4 illustrates a third example of a tile profile station 400 in accordance with certain embodiments of the disclosed technology. In the example, there is within the tile profile station 400 a currently displayed tile profile 402, such as the tile profile 202 of FIG. 2. A tile collection tool 404 may be presented to allow the user to add, e.g., by dragging and dropping, one of the tiles 410, 412, and 414 listed by the tile collection tool 404 into the currently displayed tile profile 402. Alternatively or in addition thereto, the user may be able to remove a tile within the currently presented tile profile 402 by dragging and dropping the tile into the tile collection tool 404, for example.

In the example, a link to a tile creation tool 406 is also presented as well a tile search tool 408. A user may use the tile search tool 408 to search for a particular tile or set of tiles within his or her own tile repository. Alternatively or in addition thereto, the user may search for a particular tile or set of tiles within other users' repositories, such as those of his or her friends or other people or entities with whom the user has established some type of online connection.

Figure 5:
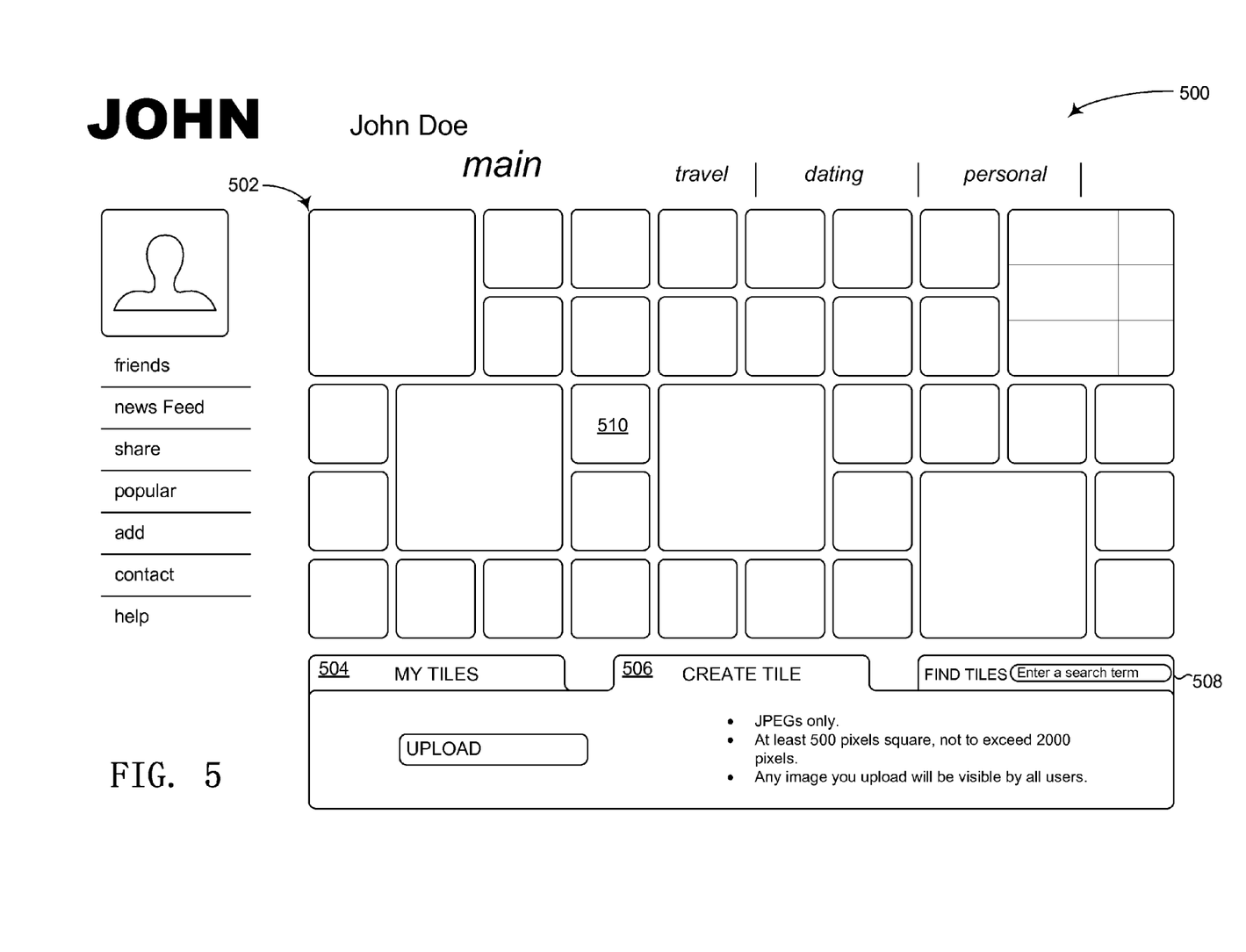
FIG. 5 illustrates a fourth example of a tile profile station in accordance with certain embodiments of the disclosed technology.

FIG. 5 illustrates a fourth example of a tile profile station 500 in accordance with certain embodiments of the disclosed technology. In the example, a tile creation tool 506, such as the tile creation tool 406 of FIG. 4, is presented to allow the user or other authorized individual to create an individual tile, e.g., to be added to the currently displayed tile profile 502 within the tile profile station 500.

The example also includes a link to a tile collection tool 504 and a tile search tool 508, such as the link to the tile collection tool 404 and tile search tool 408 of FIG. 4, respectively, presented in connection with the tile profile station 500. By selecting either 504 or 508, the user causes the corresponding tool to activate.

Figure 6:
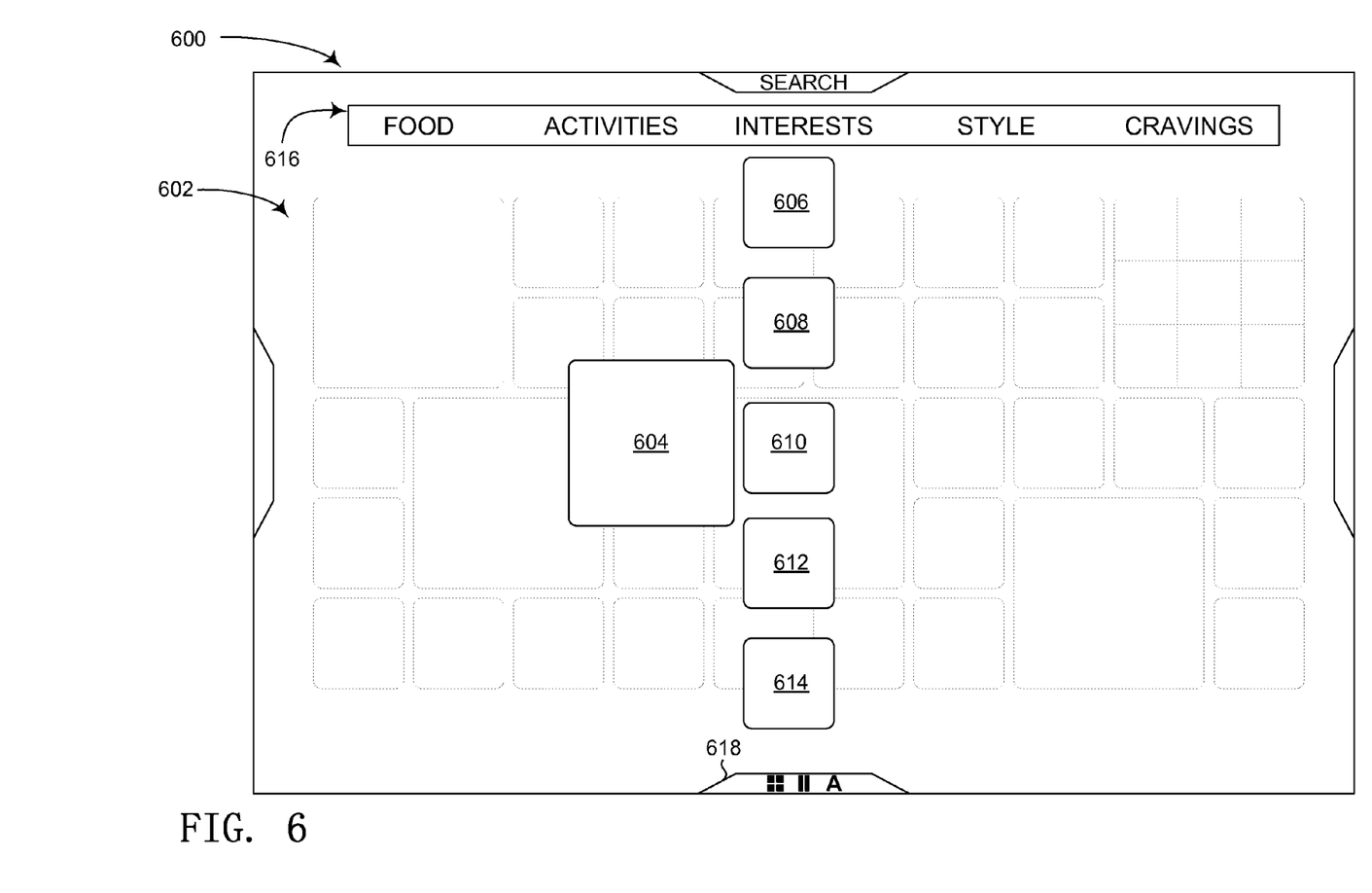
FIG. 6 illustrates an example of a first scrolling mechanism in accordance with certain embodiments of the disclosed technology.

FIG. 6 illustrates an example of a first scrolling mechanism 600 in accordance with certain embodiments of the disclosed technology. The example includes a currently displayed tile profile 602, such as the tile profile 502 of FIG. 5. In the example, a tile 604, such as the tile 510 of FIG. 5, selected by the user has some connection to a number of other tiles 606-614. For example, if the selected tile 604 is an image of a user's favorite food, e.g., steak, then the related tiles 606-614 may each pertain to a particular restaurant, a certain cookbook, the user's favorite meat market, etc.

As the user swipes his or her finger along multiple tiles within the tile profile 602 displayed on a touch-sensitive device such as an Apple iPad device, for example, the selected tile 604 is changed accordingly along with the related tiles 606-614 that are displayed. Depending on how many related tiles there are for each of the tiles within the tile profile 602, the number of related tiles displayed may change as the user shifts the selected tile 604 from one to another.

In the example, selection of the tile 604 caused the selected tile 604 and related tiles 606-614 to be displayed more prominently than the other tiles of the tile profile 602. For example, the selected tile 604 is now displayed larger than before selection and the related tiles 606-614 are made to appear to hover over the other tiles within the tile profile 602. In certain embodiments, some or all of the related tiles 606-614 are not displayed within the currently displayed tile profile 602; rather, they are pulled from somewhere else such as the user's personal tile repository. Alternatively or in addition thereto, the other tiles within the tile profile 602 are sent further the background. For example, the tiles may be made to appear dimmed or at least partially ghosted out of view.

In the example, a menu bar 616 including a listing of links is presented as part of the scrolling mechanism 600. Each link may represent another hierarchical layer of organization for the user's tiles. For example, selection of "FOOD" by the user may prompt the scrolling mechanism 600 to display tiles that have some type of food-related connection as previously established by the user. A virtual switch 618 may be used to allow the user to switch between the current scrolling mechanism 600 and another scrolling mechanism such as the scrolling mechanism 700 of FIG. 7, discussed below.

Figure 7:
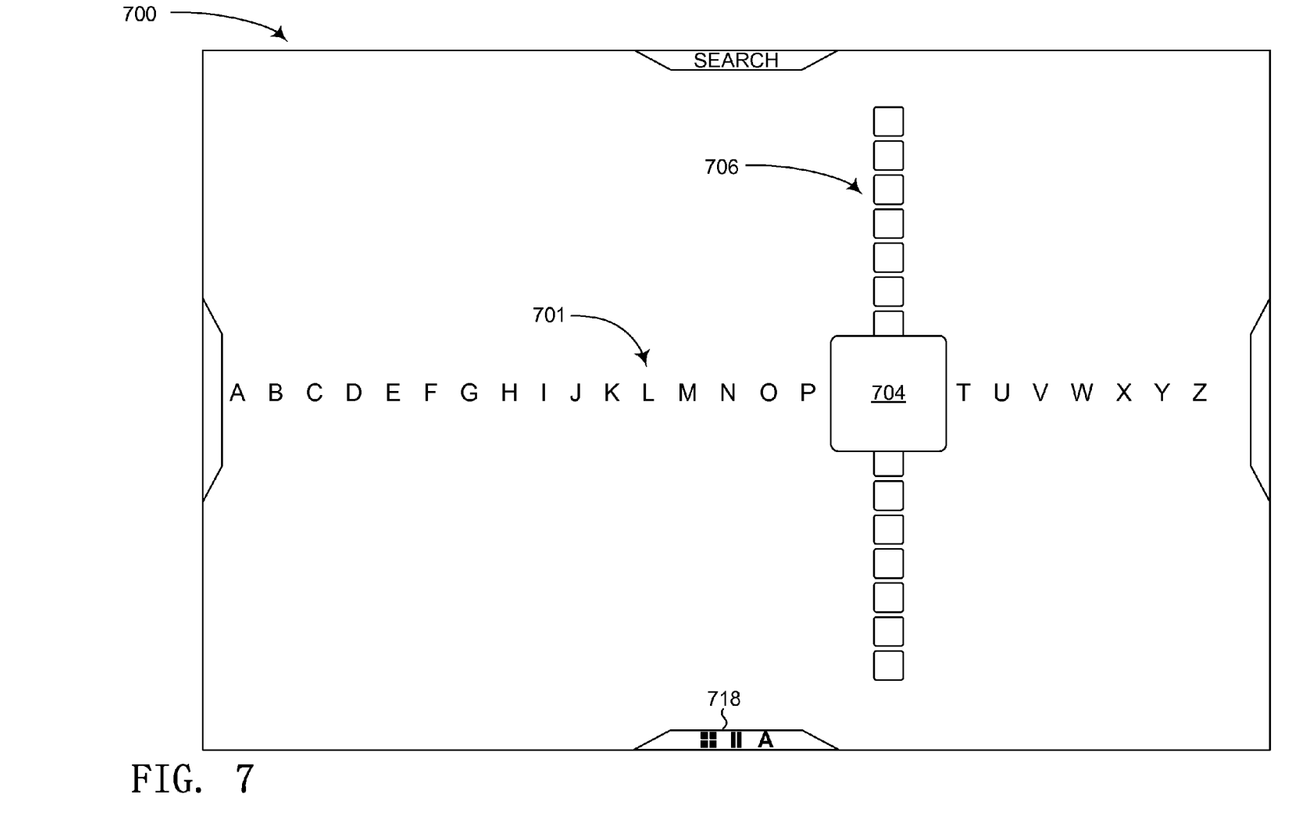
FIG. 7 illustrates an example of a second scrolling mechanism in accordance with certain embodiments of the disclosed technology.

FIG. 7 illustrates an example of a second scrolling mechanism 700 in accordance with certain embodiments of the disclosed technology. In the example, a horizontal presentation of the alphabet 701 is displayed such that, upon selection of a certain letter, a set of tiles 706 is presented in a vertical manner. The set of tiles 706 displayed by the scrolling mechanism 700 depends on which letter is selected. In the example, the letter R is currently selected, so each tile in the set of tiles 706 likely has a label or other indicator that starts with the letter R.

A certain tile 704 is presented more prominently than the other tiles within the set of tiles 706. The prominent tile 704 may be the first tile in the list alphabetically, for example, or it may have an interest indicator that is higher than the others. Regardless, as the user shifts focus along the set 706 vertically, e.g., by swiping his or her finger along the set 706 if the scrolling mechanism 700 is being displayed by a touch-sensitive machine such as an Apple iPad device, the prominent tile 704 changes accordingly such that the tile that currently has the focus is the tile that is being presented most prominently. As the user shifts focus along the alphabet 701 horizontally, the set of tiles 706, including the prominent tile 704, moves accordingly, e.g., horizontally in the same direction as that of the shift in focus.

Figure 8:
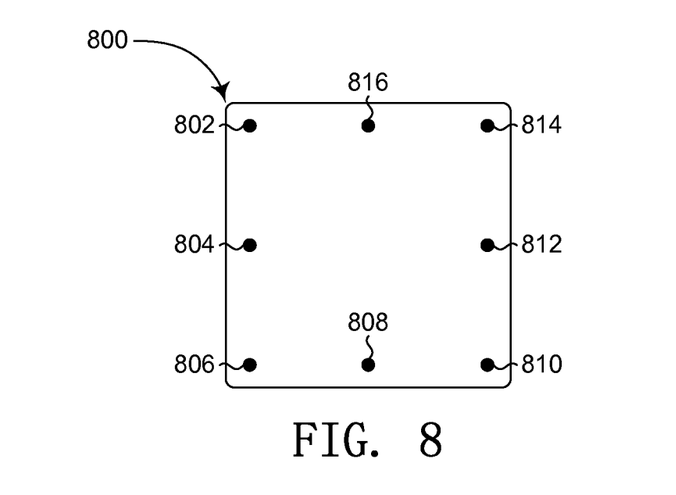
FIG. 8 illustrates an example of a tile having multiple motion points in accordance with certain embodiments of the disclosed technology.

FIG. 8 illustrates an example of a tile 800 having eight multiple motion points 802-816 in accordance with certain embodiments of the disclosed technology. Other embodiments may include a tile having fewer or more motion points. In the example, selection of a motion point causes the tile 800 to appear to rotate about a particular axis to reveal a certain type of information. Consider an example in which a user selects motion point 802 by clicking on it using a traditional input device such as a mouse or, in the case of a touch-sensitive device such as an Apple iPad, touching the motion point 802 using a finger, stylus, etc.

Selection of motion point 802 causes the tile 800 to appear to rotate 180 degrees about an axis defined by motion points 806 and 814, resulting in the appearance of the "backside" of the tile 800 which presents any of a number of types of data, such as contextual data, as discussed in detail below. A subsequent selection of the motion point 802 causes the tile 800 to appear to rotate 180 degrees about the same axis, i.e., as defined by motion points 806 and 814, in either the same direction as before or counter to the original direction.

Selection of motion point 804 causes the tile 800 to appear to rotate 180 degrees about an axis defined by motion points 808 and 816, again resulting in the appearance of the "backside" of the tile 800 except that the data presented is of a different type than when another motion point, e.g., motion point 802, is selected. Indeed, each of the motion points 802-816 may correspond to a distinct data type. Alternatively or in addition to these embodiments, repeated selection of the same motion point may cause the tile 800 to switch between the "backside" and the "frontside" or to cycle through multiple types of data before returning to either of the "backside" or "frontside."

Tiles may be transferrable between users, entities, or both. For example, a user may send one or more tiles to other users that he or she thinks may want to add to their tile profile(s). Entities, such as businesses, may send tiles as a promotion or other sales-related activity or event. For example, in certain embodiments, a tile may serve as an invitation for reservation, advertisement, promotional offer, discount, coupon, or gift card. In such embodiments, selection of a certain motion point on the tile may result in visual presentation of details pertaining to a particular offer made available to the user. For example, a hotel may send a tile to a certain user in order to advertise a discounted offer for an extended stay at the hotel. The user may select a motion point on the tile to review details of the offer, select another motion point to view the pertinent dates, and select another motion point to access a link that, when selected, results in the sending of a reservation request for the user to the hotel.

Figure 9:
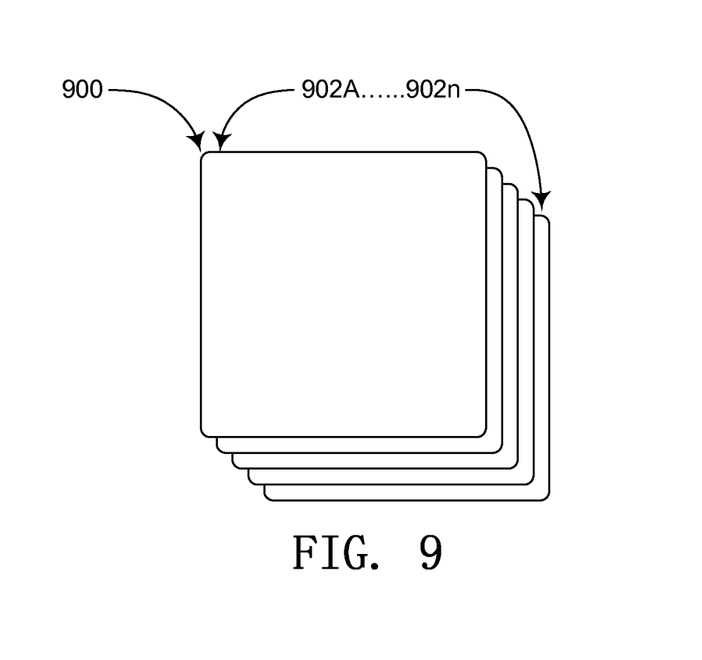
FIG. 9 illustrates an example of a tile stack in accordance with certain embodiments of the disclosed technology.

In certain embodiments, a tile profile may include tiles, tile stacks, or a combination thereof. FIG. 9 illustrates an example of a tile stack 900 including multiple tiles 902A-902n in accordance with certain embodiments of the disclosed technology. Tiles 902A-902n may be selected by the user or the system. For example, the user may select a number of tiles within a tile profile using a tile profile station and select a "Make Stack" feature, causing the system to associate the tiles together and visually present the tiles as a stack. Selection of a tile 902n other than the tile 902A at the "top" of the tile stack 900 will result in the "moving" of the selected tile 902n to the "top" of the stack. In certain embodiments, tiles within the tile stack 900 can be "removed" from the stack by way of conventional selecting and dragging operations, for example.

Figure 10:
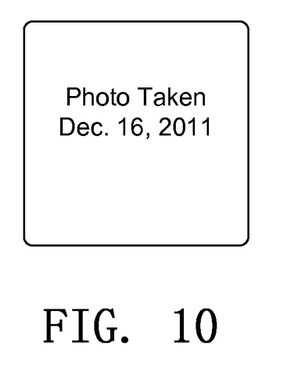
FIG. 10 illustrates an example of presenting image/video data corresponding to a tile in accordance with certain embodiments of the disclosed technology.

FIG. 10 illustrates an example of presenting image/video data 1000 corresponding to a tile in accordance with certain embodiments of the disclosed technology. This is one of the types of data that may be presented by the "backside" of a tile responsive to selection of a motion point of the tile as described above with regard to FIG. 8, for example. Image/video data 1000 may include information pertaining to when the tile was created, when the image or video of the tile was created, what device was used to capture the image/video, who captured the image/video, etc.

Figure 11:
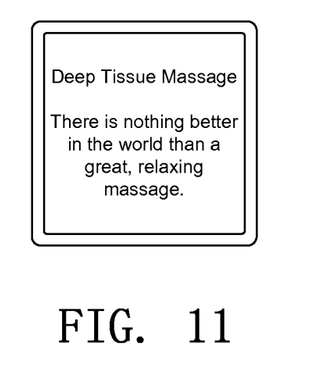
FIG. 11 illustrates an example of presenting contextual data corresponding to a tile in accordance with certain embodiments of the disclosed technology.

FIG. 11 illustrates an example of presenting contextual data 1100 corresponding to a tile in accordance with certain embodiments of the disclosed technology. This is a second type of data that may be presented by the "backside" of a tile responsive to selection of a motion point of the tile as described above with regard to FIG. 8, for example. Contextual data 1100 may include comments added by the user and may be limited to a particular number of characters, e.g., 140 characters. Consider an example in which the tile is an image of one of the user's favorite hotels. In such a case, the user may wish to add a description of the hotel to be able to be visually presented in connection with the tile.

Figure 12:
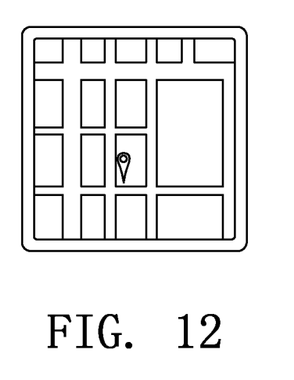
FIG. 12 illustrates an example of presenting locational data corresponding to a tile in accordance with certain embodiments of the disclosed technology.

FIG. 12 illustrates an example of presenting locational data 1200 corresponding to a tile in accordance with certain embodiments of the disclosed technology. This is a third type of data that may be presented by the "backside" of a tile responsive to selection of a motion point of the tile as described above with regard to FIG. 8, for example. Locational data 1200 may include information pertaining to a geographical location of the subject of the tile. For example, if the tile is a picture of the user's favorite restaurant, the locational data 1200 may include a map showing a dropped pin at the location of the restaurant.

Figure 13:
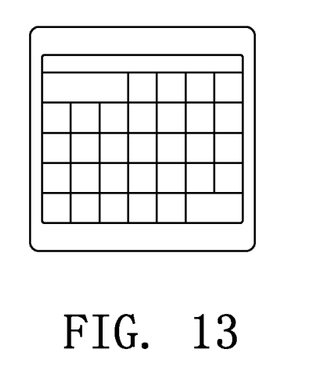
FIG. 13 illustrates an example of presenting temporal data corresponding to a tile in accordance with certain embodiments of the disclosed technology.

FIG. 13 illustrates an example of presenting temporal data 1300 corresponding to a tile in accordance with certain embodiments of the disclosed technology. This is a fourth type of data that may be presented by the "backside" of a tile responsive to selection of a motion point of the tile as described above with regard to FIG. 8, for example. Temporal data 1300 may include information pertaining to date and/or time of interest with regard to the tile. For example, if the tile is a photograph of a football stadium, the temporal data 1300 may include a calendar in which certain dates, e.g., dates corresponding to upcoming football games to be played at the stadium, are visually distinguishable from the other dates, e.g., highlighted.

Figure 14:
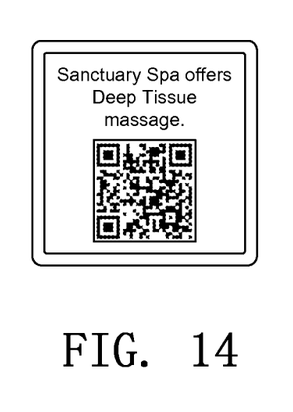
FIG. 14 illustrates an example of presenting brand data corresponding to a tile in accordance with certain embodiments of the disclosed technology.

FIG. 14 illustrates an example of presenting brand data 1400 corresponding to a tile in accordance with certain embodiments of the disclosed technology. This is a fifth type of data that may be presented by the "backside" of a tile responsive to selection of a motion point of the tile as described above with regard to FIG. 8, for example. Brand data 1400 may include commercial/marketing information pertaining to the subject of the tile. For example, if the tile is an image of the user's favorite spa, the brand data 1400 may include a brief description of the spa. Alternatively or in addition thereto, the brand data 1400 may include a Quick Response (QR) code.

The following discussion is intended to provide a brief, general description of a suitable machine in which embodiments of the disclosed technology can be implemented. As used herein, the term "machine" is intended to broadly encompass a single machine or a system of communicatively coupled machines or devices operating together. Exemplary machines can include computing devices such as personal computers, workstations, servers, portable computers, handheld devices, tablet devices, communications devices such as cellular phones and smart phones, and the like. These machines may be implemented as part of a cloud computing arrangement.

Typically, a machine includes a system bus to which processors, memory (e.g., random access memory (RAM), read-only memory (ROM), and other state-preserving medium), storage devices, a video interface, and input/output interface ports can be attached. The machine can also include embedded controllers such as programmable or non-programmable logic devices or arrays, Application Specific Integrated Circuits, embedded computers, smart cards, and the like. The machine can be controlled, at least in part, by input from conventional input devices, e.g., keyboards, touch screens, mice, and audio devices such as a microphone, as well as by directives received from another machine, interaction with a virtual reality (VR) environment, biometric feedback, or other input signal.

The machine can utilize one or more connections to one or more remote machines, such as through a network interface, modem, or other communicative coupling. Machines can be interconnected by way of a physical and/or logical network, such as an intranet, the Internet, local area networks, wide area networks, etc. One having ordinary skill in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

Embodiments of the disclosed technology can be described by reference to or in conjunction with associated data including functions, procedures, data structures, application programs, instructions, etc. that, when accessed by a machine, can result in the machine performing tasks or defining abstract data types or low-level hardware contexts. Associated data can be stored in, for example, volatile and/or non-volatile memory (e.g., RAM and ROM) or in other storage devices and their associated storage media, which can include hard-drives, floppy-disks, optical storage, tapes, flash memory, memory sticks, digital video disks, biological storage, and other tangible, non-transitory physical storage media. Certain outputs may be in any of a number of different output types such as audio or text-to-speech, for example.

Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

What is claimed is:

1. A machine-controlled method, comprising:
creating a tile profile including a plurality of tiles;
visually presenting the tile profile using a display;
selecting a first motion point of one of the plurality of tiles;
responsive to the selection of the first motion point of the tile, virtually rotating the tile 180 degrees about a first axis of the tile;
visually presenting in connection with the rotated tile a first type of data responsive to the virtual rotation about the first axis of the tile; and
storing the tile profile.

2. The machine-controlled method of claim 1, wherein each of the plurality of tiles includes one of a group consisting of: an image, a photograph, a drawing, a painting, and a video clip.

3. The machine-controlled method of claim 1, further comprising adding a new tile to the tile profile.

4. The machine-controlled method of claim 1, further comprising editing at least one of the plurality of tiles in the tile profile.

5. The machine-controlled method of claim 1, further comprising scrolling through at least some of the plurality of tiles.

6. The machine-controlled method of claim 5, wherein the scrolling comprises a horizontal scrolling mechanism and a vertical scrolling mechanism.

7. The machine-controlled method of claim 1, the tile profile further including a tile stack comprising a sub-plurality of tiles.

8. The machine-controlled method of claim 7, further comprising editing the tile stack, the editing comprising at least one of a group consisting of: adding one of the plurality of tiles to the tile stack, removing a tile from the tile stack, and reordering the tile stack.

9. The machine-controlled method of claim 1, wherein at least some of the plurality of tiles each have a shape that is at least substantially one of a group consisting of: square, rectangular, diamond, circular, and oval.

10. The machine-controlled method of claim 1, further comprising:
selecting a second motion point of the rotated tile; and
responsive to the selection of the second motion point of the rotated tile, virtually rotating the tile 180 degrees about a second corresponding axis.

11. The machine-controlled method of claim 10, further comprising visually presenting in connection with the rotated tile a second type of data responsive to the virtual rotation about the second axis of the tile.

12. The machine-controlled method of claim 1, wherein the first type of data comprises one of a group consisting of: image/video data, contextual data, locational data, temporal data, and brand data.

13. The machine-controlled method of claim 1, further comprising:
   subsequently selecting the first motion point of the rotated tile; and
   responsive to the subsequent selection of the first motion point of the tile, virtually rotating the tile 180 degrees about the first axis of the tile.

14. The machine-controlled method of claim 1, further comprising a user transmitting the stored tile profile to another user.

15. The machine-controlled method of claim 1, wherein the storing comprises storing the tile profile within a portable storage device.

16. The machine-controlled method of claim 1, wherein the portable storage device comprises a USB flash drive.

17. The machine-controlled method of claim 1, wherein the display is part of a handheld computing device.

18. The machine-controlled method of claim 17, wherein one or both of the creating and storing are performed by the handheld computing device.

19. A machine-controlled method, comprising:
   visually presenting a plurality of tiles using a display;
   selecting a first motion point of one of the plurality of tiles; and
   responsive to the selection of the first motion point of the tile, virtually rotating the tile 180 degrees about a first axis extending across the tile, wherein the first axis is defined by a second motion point and a third motion point of the tile.

\* \* \* \* \*